(12) United States Patent
Hermanson et al.

(10) Patent No.: US 12,246,526 B2
(45) Date of Patent: *Mar. 11, 2025

(54) PACKING MATERIAL AND METHOD OF MANUFACTURING THE PACKING MATERIAL

(71) Applicant: Terry Hermanson, New York, NY (US)

(72) Inventors: Terry Hermanson, New York, NY (US); Huang Meng-Suen, Hong Kong (CN)

(73) Assignee: Terry Hermanson, Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/351,912

(22) Filed: Jul. 13, 2023

(65) Prior Publication Data

US 2024/0067432 A1 Feb. 29, 2024

Related U.S. Application Data

(60) Provisional application No. 63/492,910, filed on Mar. 29, 2023, provisional application No. 63/405,997, (Continued)

(51) Int. Cl.
*B32B 3/30* (2006.01)
*B31D 5/00* (2017.01)
(Continued)

(52) U.S. Cl.
CPC .............. *B32B 5/16* (2013.01); *B31D 5/0069* (2013.01); *B31D 5/0078* (2013.01); *B32B 3/26* (2013.01);
(Continued)

(58) Field of Classification Search
None
See application file for complete search history.

(56) References Cited

U.S. PATENT DOCUMENTS

| 1,189,140 | A | 6/1916 | Lane |
| 1,984,653 | A | 12/1934 | Palmer et al. |

(Continued)

FOREIGN PATENT DOCUMENTS

| CN | 102712400 A | 10/2012 |
| CN | 104371343 A | 2/2015 |

(Continued)

OTHER PUBLICATIONS

Machine Translation of JP-04118365-U, Oct. 1992 (Year: 1992).*

(Continued)

*Primary Examiner* — Jeffrey A Vonch
(74) *Attorney, Agent, or Firm* — Venable LLP

(57) ABSTRACT

A molded packing material and a method of making the molded packing material. The molded packing material includes a plurality of molded fiber cushioning elements. The molded packing may also include a matrix comprising cellulosic fibers bonding the plurality of molded fiber cushioning elements to each other. The plurality of molded fiber cushioning elements and matrix form a mass that has been molded into a shape having exterior surfaces and an interior with some of the plurality of molded fiber cushioning elements being on the exterior surfaces of the mass and the remainder of the plurality of molded fiber cushioning elements being in the interior of the mass. The molded packing material may also include a fiber shell having a cavity formed therein with the plurality of molded fiber cushioning elements located in the cavity.

30 Claims, 11 Drawing Sheets

Related U.S. Application Data filed on Sep. 13, 2022, provisional application No. 63/400,508, filed on Aug. 24, 2022.

(51) Int. Cl.

| | | |
|---|---|---|
| *B32B 3/26* | (2006.01) | |
| *B32B 5/02* | (2006.01) | |
| *B32B 5/16* | (2006.01) | |
| *B32B 29/00* | (2006.01) | |
| *B32B 29/04* | (2006.01) | |
| *B65D 81/05* | (2006.01) | |
| *B65D 81/107* | (2006.01) | |
| *B65D 81/113* | (2006.01) | |
| *B65D 25/14* | (2006.01) | |
| *B65D 25/16* | (2006.01) | |
| *B65D 81/09* | (2006.01) | |
| *B65D 81/127* | (2006.01) | |
| *B65D 81/133* | (2006.01) | |

(52) U.S. Cl.
CPC .............. *B32B 5/02* (2013.01); *B32B 29/005* (2013.01); *B32B 29/04* (2013.01); *B65D 81/051* (2013.01); *B65D 81/107* (2013.01); *B31D 5/0039* (2013.01); *B31D 5/006* (2013.01); *B31D 5/0073* (2013.01); *B31D 2205/0005* (2013.01); *B31D 2205/0047* (2013.01); *B31D 2205/0064* (2013.01); *B32B 3/30* (2013.01); *B32B 29/002* (2013.01); *B32B 2262/062* (2013.01); *B32B 2264/062* (2013.01); *B32B 2264/065* (2013.01); *B32B 2264/067* (2013.01); *B32B 2553/00* (2013.01); *B32B 2553/02* (2013.01); *B65D 25/14* (2013.01); *B65D 25/16* (2013.01); *B65D 81/09* (2013.01); *B65D 81/1075* (2013.01); *B65D 81/113* (2013.01); *B65D 81/127* (2013.01); *B65D 81/133* (2013.01); *B65D 2581/053* (2013.01); *Y02W 90/10* (2015.05); *Y10S 206/814* (2013.01); *Y10S 493/967* (2013.01); *Y10T 428/23* (2015.01); *Y10T 428/237* (2015.01); *Y10T 428/239* (2015.01); *Y10T 428/24496* (2015.01); *Y10T 428/24562* (2015.01); *Y10T 428/24612* (2015.01); *Y10T 428/249926* (2015.04); *Y10T 428/249986* (2015.04); *Y10T 428/253* (2015.01); *Y10T 442/693* (2015.04)

(56) References Cited

U.S. PATENT DOCUMENTS

| | | | |
|---|---|---|---|
| 2,045,384 A | 6/1936 | Gerb | |
| 2,657,158 A | 10/1953 | Gerard | |
| 2,744,624 A | 5/1956 | Hoogstoel et al. | |
| 2,924,154 A | 2/1960 | Russell et al. | |
| 2,978,006 A | 4/1961 | Clemens | |
| 3,040,948 A | 6/1962 | Wells | |
| 3,074,543 A | 1/1963 | Stanley | |
| 3,131,240 A | 4/1964 | Kirkpatrick | |
| 3,231,454 A | 1/1966 | Williams | |
| 3,509,797 A | 5/1970 | Johnson | |
| 3,530,020 A | 9/1970 | Liebermann | |
| 3,546,055 A | 12/1970 | Spertus | |
| 3,616,158 A | 10/1971 | Rubens et al. | |
| 3,650,877 A | 3/1972 | Johnson | |
| 3,655,500 A | 4/1972 | Johnson | |
| 3,741,411 A | 6/1973 | Peacock | |
| 3,812,618 A | 5/1974 | Wood et al. | |
| 4,384,442 A | 5/1983 | Pendleton | |
| 4,644,733 A | 2/1987 | Dolinar | |
| 4,680,918 A | 7/1987 | Lovell | |
| 4,806,410 A | 2/1989 | Armington et al. | |
| 4,828,913 A | 5/1989 | Kiss | |
| 4,880,119 A | 11/1989 | Simon | |
| 4,937,131 A | 6/1990 | Baldacci et al. | |
| 4,941,922 A * | 7/1990 | Snyder ................... | C09J 103/02 |
| | | | 524/53 |
| 4,997,091 A | 3/1991 | McCrea | |
| 5,151,312 A * | 9/1992 | Boeri ..................... | B65D 81/09 |
| | | | 428/903.3 |
| 5,230,943 A | 7/1993 | Pregont | |
| 5,251,414 A | 10/1993 | Duke | |
| 5,312,665 A | 5/1994 | Pratt et al. | |
| 5,330,165 A | 7/1994 | van Goubergen | |
| 5,340,638 A | 8/1994 | Sperner | |
| 5,468,556 A | 11/1995 | Fuss et al. | |
| 5,545,297 A | 8/1996 | Andersen et al. | |
| 5,568,867 A | 10/1996 | Lencoski | |
| 5,569,519 A | 10/1996 | Ervay et al. | |
| 5,595,811 A | 1/1997 | Stout, Jr. | |
| 5,623,815 A | 4/1997 | Hornstein et al. | |
| 5,636,744 A * | 6/1997 | Hirose ................. | B65D 81/025 |
| | | | 206/592 |
| 5,639,543 A | 6/1997 | Isoda et al. | |
| 5,658,624 A | 8/1997 | Anderson et al. | |
| 5,674,344 A | 10/1997 | Thompson et al. | |
| 5,683,772 A | 11/1997 | Andersen et al. | |
| 5,688,578 A | 11/1997 | Goodrich | |
| 5,756,127 A | 5/1998 | Grisoni et al. | |
| 5,826,404 A | 10/1998 | Fuss et al. | |
| 5,871,857 A | 2/1999 | Alhamad | |
| 5,900,119 A | 5/1999 | Goers et al. | |
| 5,910,079 A | 6/1999 | Watanabe | |
| 5,910,089 A | 6/1999 | Weder | |
| 5,944,192 A | 8/1999 | Weder | |
| 5,992,637 A | 11/1999 | Weder | |
| 6,067,779 A | 5/2000 | Weder | |
| 6,128,889 A | 10/2000 | Fuss | |
| 6,254,945 B1 | 7/2001 | Simmons | |
| 6,298,637 B1 | 10/2001 | Weder | |
| 6,385,949 B2 | 5/2002 | Weder | |
| 6,532,721 B1 | 3/2003 | Weder | |
| 6,546,701 B2 | 4/2003 | Weder et al. | |
| 6,632,165 B1 | 10/2003 | Letourneau et al. | |
| 6,752,910 B2 | 6/2004 | Sato et al. | |
| 6,797,119 B2 | 9/2004 | Koike | |
| 6,871,480 B1 | 3/2005 | Goodrich | |
| 6,969,548 B1 | 11/2005 | Goldfine | |
| 7,651,455 B2 | 1/2010 | Yampolsky et al. | |
| 7,803,100 B2 | 9/2010 | Lu et al. | |
| 8,052,037 B2 | 11/2011 | Bussey, III et al. | |
| 8,146,748 B2 | 4/2012 | Vulpitta | |
| 8,201,671 B2 | 6/2012 | Cho | |
| 8,360,949 B2 | 1/2013 | Wetsch et al. | |
| 8,763,667 B2 | 7/2014 | De Luca | |
| 8,900,111 B2 | 12/2014 | Wetsch et al. | |
| 8,999,490 B2 | 4/2015 | Kung et al. | |
| 9,205,621 B2 | 12/2015 | Cheich | |
| 9,315,312 B2 | 4/2016 | De Luca et al. | |
| 9,427,928 B2 | 8/2016 | Arora et al. | |
| 9,457,982 B2 | 10/2016 | Wetsch et al. | |
| 9,688,044 B2 | 6/2017 | Deis et al. | |
| 10,099,836 B2 | 10/2018 | Cheich | |
| 10,357,936 B1 | 7/2019 | Vincent et al. | |
| 10,392,177 B2 | 8/2019 | Lantz | |
| 10,766,220 B2 | 9/2020 | Deis et al. | |
| 10,766,221 B2 | 9/2020 | Deis et al. | |
| 10,792,882 B2 | 10/2020 | Wetsch et al. | |
| 10,828,859 B2 | 11/2020 | Ciasullo, Jr. et al. | |
| 11,123,943 B2 | 9/2021 | Cheich et al. | |
| 11,161,668 B1 * | 11/2021 | Hermanson ............ | B65D 81/05 |
| 11,167,907 B1 | 11/2021 | Hermanson et al. | |
| 11,358,775 B2 | 6/2022 | Hermanson et al. | |
| 11,390,443 B2 | 7/2022 | Hermanson et al. | |
| 11,390,444 B2 | 7/2022 | Hermanson et al. | |
| 2002/0040859 A1 | 4/2002 | Weder | |
| 2003/0051819 A1 | 3/2003 | Moustier | |
| 2004/0050743 A1 | 3/2004 | Slovencik et al. | |
| 2004/0052988 A1 | 3/2004 | Slovencik et al. | |
| 2004/0108243 A1 | 6/2004 | Jeannin | |

(56) References Cited

U.S. PATENT DOCUMENTS

| | | |
|---|---|---|
| 2005/0230864 A1 | 10/2005 | Ozasa et al. |
| 2006/0281621 A1 | 12/2006 | Weder |
| 2007/0082181 A1 | 4/2007 | Jung |
| 2008/0153685 A1 | 6/2008 | Cheich et al. |
| 2009/0082187 A1 | 3/2009 | Cheich et al. |
| 2010/0323153 A1 | 12/2010 | Huskey |
| 2011/0053743 A1 | 3/2011 | Wetsch et al. |
| 2011/0061986 A1 | 3/2011 | Orsini et al. |
| 2012/0031957 A1 | 2/2012 | Whitaker |
| 2012/0097067 A1 | 4/2012 | Fascio |
| 2012/0104009 A1 | 5/2012 | Fascio |
| 2012/0165172 A1 | 6/2012 | Wetsch et al. |
| 2013/0171422 A1* | 7/2013 | De Luca ............ B32B 3/266 428/172 |
| 2013/0313277 A1 | 11/2013 | Stewartson et al. |
| 2014/0155241 A1 | 6/2014 | Cheich et al. |
| 2016/0060014 A1 | 3/2016 | Timmers et al. |
| 2016/0221233 A1 | 8/2016 | Kiiskinen et al. |
| 2018/0029764 A1 | 2/2018 | Chung et al. |
| 2018/0030659 A1 | 2/2018 | Chung et al. |
| 2018/0126686 A1 | 5/2018 | Nelson et al. |
| 2018/0264768 A1 | 9/2018 | Haug |
| 2018/0319116 A1 | 11/2018 | Haug |
| 2018/0370702 A1 | 12/2018 | Goodrich |
| 2020/0061951 A1 | 2/2020 | Slovencik |
| 2020/0063361 A1 | 2/2020 | Everett et al. |
| 2020/0115087 A1 | 4/2020 | Hagestedt et al. |
| 2020/0139661 A1 | 5/2020 | Greenwell |
| 2020/0180841 A1 | 6/2020 | Alvarez et al. |
| 2021/0061535 A1 | 3/2021 | Moore et al. |
| 2021/0179333 A1 | 6/2021 | Wetsch |
| 2021/0237961 A1 | 8/2021 | Lenart et al. |

FOREIGN PATENT DOCUMENTS

| | | | |
|---|---|---|---|
| CN | 208560317 U * | 3/2019 | |
| DE | 40 25 257 C2 | 9/1992 | |
| DE | 42 25 143 A1 | 2/1994 | |
| DE | 19525447 A1 * | 1/1997 | ........... B65D 65/466 |
| EP | 0560608 A1 | 9/1993 | |
| EP | 3747798 A1 | 12/2020 | |
| EP | 3981588 A1 | 4/2022 | |
| JP | 04118365 U * | 10/1992 | |
| JP | 06247471 A * | 9/1994 | |
| JP | H06-247471 A | 9/1994 | |
| JP | 06312768 A * | 11/1994 | |
| JP | 06336262 A * | 12/1994 | |
| JP | 3006498 U * | 1/1995 | |
| JP | 07237669 A * | 9/1995 | |
| JP | H08-244853 A | 9/1996 | |
| JP | 2000118571 A | 4/2000 | |
| JP | 2002-225946 A | 4/2002 | |
| KR | 10-1631131 B1 | 6/2016 | |
| WO | 92/04253 A1 | 3/1992 | |
| WO | 94/12576 | 6/1994 | |
| WO | 97/09248 | 3/1997 | |
| WO | 2023/176001 A1 | 9/2023 | |

OTHER PUBLICATIONS

Machine Translation of JP-06312768-A, Nov. 1994 (Year: 1994).*
Machine Translation of JP-06336262-A, Dec. 1994 (Year: 1994).*
Machine Translation of JP-07237669-A, Sep. 1995 (Year: 1995).*
Machine Translation of JP-3006498-U, Jan. 1995 (Year: 1995).*
Machine Translation of CN-208560317-U, Mar. 2019 (Year: 2019).*
Comprehensive Guide to cushioning and void fill for shipping packaging, Internet Archive of https://www.ecoenclose.com/Definitive-Guide-to-Void-Fill-and-Cushioning/ (captured Sep. 18, 2019), available at https://web.archive.org/web/20190918180012/https://www.ecoenclose.com/Definitive-Guide-to-Void-Fill-and-Cushioning/.
Expandos, https://expandos.com, visited Oct. 29, 2020.
"Paper Packaging Applications", Paper Packaging Systems, https://www.paperpackagingsystems.com/paper-packaging-applications-paper, visited Oct. 29, 2020.
"Crinkle Cut Fill", Bags and Bows Online, https://www.bagsandbowsonline.com/retail-packaging/search?Ntt=crinkle cut fill, visited Oct. 29, 2020.
"Molded Pulp Bubble Wrap," YouTube, with selected screen shots, available at https://youtu.be/36g0IVZ6OU8?si=-4upcDe4TydOEOtL (accessed Dec. 16, 2023).
"Paper Bubble Cushioning", Lumi Products https://www.lumi.com/products/paper-bubble-cushioning (accessed Dec. 16, 2023).
Office Action dated Jan. 9, 2024, in Japanese Patent Application No. 2023-504354.
Office Action dated Nov. 7, 2024, in Korean Patent Application No. 10-2023-7005700.

* cited by examiner

PACKING MATERIAL AND METHOD OF MANUFACTURING THE PACKING MATERIAL

CROSS-REFERENCE TO RELATED APPLICATIONS

This application claims the benefit under 35 U.S.C. § 119(e) of U.S. Provisional Patent Application No. 63/400,508, filed Aug. 24, 2022, and titled "PACKING MATERIAL AND METHOD OF MANUFACTURING THE PACKING MATERIAL," U.S. Provisional Patent Application No. 63/405,997, filed Sep. 13, 2022, and titled "PACKING MATERIAL AND METHOD OF MANUFACTURING THE PACKING MATERIAL," and U.S. Provisional Patent Application No. 63/492,910, filed Mar. 29, 2023, and titled "PACKING MATERIAL AND METHOD OF MANUFACTURING THE PACKING MATERIAL." The foregoing applications are incorporated herein by reference in their entireties.

FIELD OF THE INVENTION

The invention relates to packing material and to methods of manufacturing the same.

BACKGROUND OF THE INVENTION

Various packing materials are used to secure and protect items in shipping containers, including cardboard boxes, to thereby prevent damage to these items if they move within the shipping container during shipment or other impacts during shipping, air, and land transport, such as being dropped or impacted. Such packing materials include bubble wrap, expanded polystyrene foam (EPS foam), and other plastic foam packing, which may be molded into blocks or into other shapes, peanuts, and inflated plastic bags (also known as air pillows). These plastic products may be discarded as waste after they have been used during shipping. Plastic waste takes a significant time to decompose and produces carbon dioxide in the decomposition process. In addition, EPS foam does not readily biodegrade, and may take many, many years to effectively break down.

SUMMARY OF THE INVENTION

In one aspect, the invention relates to packing materials using a plurality of molded fiber cushioning elements. Such packing materials may include molded packing materials.

In another aspect, the invention relates to a molded packing material. The molded packing material includes a plurality of molded fiber cushioning elements and a matrix comprising cellulosic fibers bonding the plurality of molded fiber cushioning elements to each other. The plurality of molded fiber cushioning elements and matrix form a mass that has been molded into a shape having exterior surfaces and an interior with some of the plurality of molded fiber cushioning elements being on the exterior surfaces of the mass and the remainder of the plurality of molded fiber cushioning elements being in the interior of the mass.

In a further aspect, the invention relates to a molded packing material. The molded packing material includes a fiber shell and a plurality of molded fiber cushioning elements. The fiber shell has a cavity formed therein, and the plurality of molded fiber cushioning elements is located in the cavity of the fiber shell.

In still another aspect, the invention relates to a method of manufacturing molded packing material. The method includes filling a mold with a plurality of molded fiber cushioning elements and an aqueous slurry of cellulosic fibers, drying the aqueous slurry and the plurality of molded fiber cushioning elements to form a molded packing material, and removing the molded packing material from the mold.

These and other aspects of the invention will become apparent from the following disclosure.

BRIEF DESCRIPTION OF THE DRAWINGS

FIG. 1A is a side, perspective view of the cylindrical-shaped cellulosic cushioning element. FIG. 1B is a top view of the cylindrical-shaped cellulosic cushioning element. FIG. 1C is a bottom view of the cylindrical-shaped cellulosic cushioning element. FIG. 1D is a cross-sectional view of the cylindrical-shaped cellulosic cushioning element, taken along line 1D-1D in FIG. 1B.

FIG. 2A is a top view of the panel, and FIG. 2B is a side view of the panel.

FIG. 3A is a top, perspective view of the hemispherical-shaped cellulosic cushioning element. FIG. 3B is a bottom, perspective view of the hemispherical-shaped cellulosic cushioning element. FIG. 3C is a cross-sectional view of the hemispherical-shaped cellulosic cushioning element, taken along line 3C-3C in FIG. 3A.

DETAILED DESCRIPTION OF THE PREFERRED EMBODIMENTS

With an increased awareness of the negative effects of plastics and EPS foam on the environment, as discussed above, companies and consumers are increasingly seeking to use environmentally-friendly, recyclable, and biodegradable products as a packing material. The packing materials discussed herein provide environmentally-friendly, recyclable, and biodegradable products while also providing sufficient cushioning effects at an affordable cost. In particular, embodiments discussed herein may be environmentally-friendly, recyclable, and biodegradable replacements for EPS foam.

The packing materials disclosed herein utilize a cushioning element as a base material. The cushioning elements discussed herein are discrete cushioning elements formed from cellulosic materials, like natural cellulosic materials, as such cellulosic materials are recyclable and biodegradable. In embodiments discussed herein, the discrete cushioning element is formed by using a molded pulp process (also known as a molded fiber process), as will be discussed further below. The pulp or fibers used in this process are preferably cellulosic pulp or fibers and, even more preferably, pulp and fibers produced from post-consumer recycled paper, recycled paperboard/fiberboard, recycled cardboard, and the like. The discrete cushioning element is thus a molded cellulosic cushioning element, a molded pulp discrete cushioning element, or a molded paper fiber discrete cushioning element.

Figure 1A:
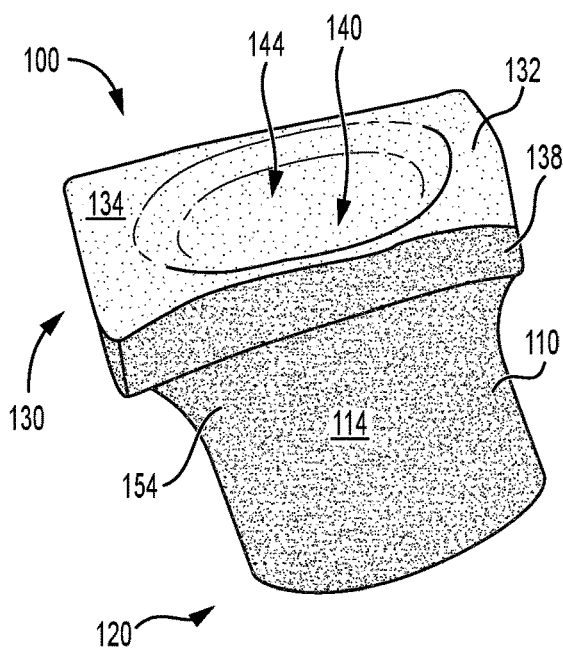
FIGS. 1A-1D show a cylindrical-shaped cellulosic cushioning element that can be used in the packing materials discussed herein.
Figure 1B:
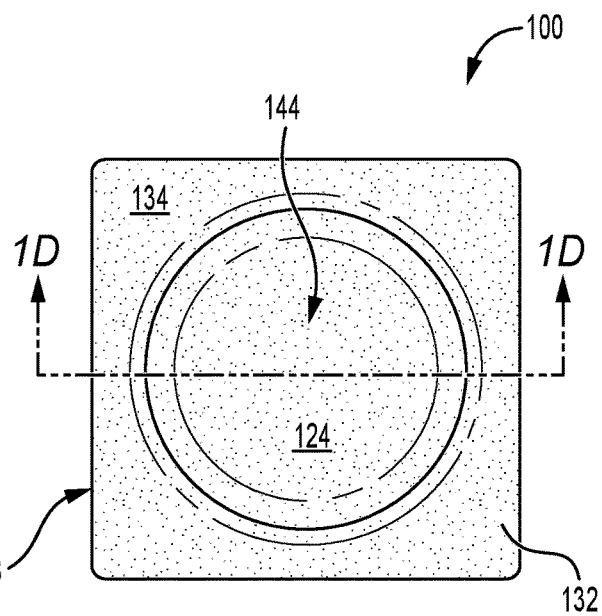
Figure 1C:
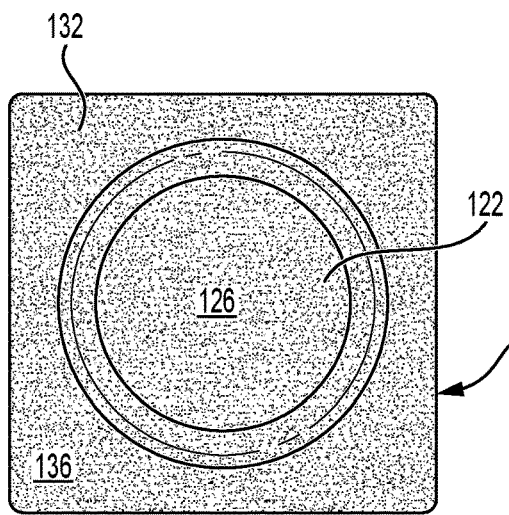
Figure 1D:
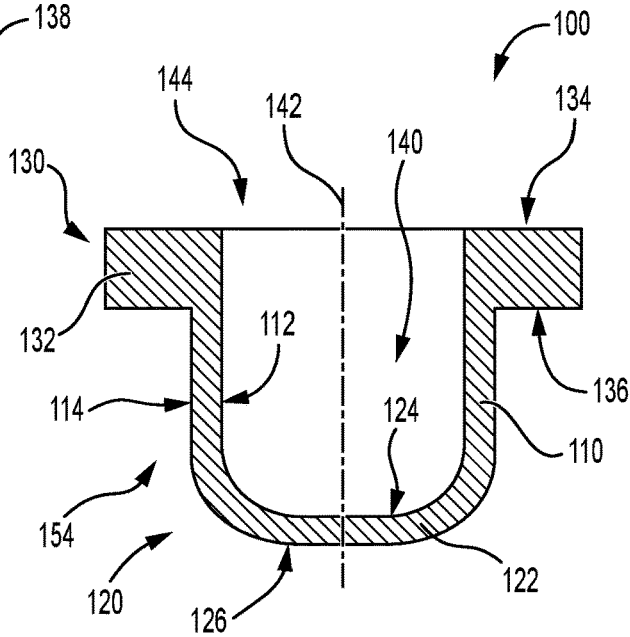

The pulp and fibers may be molded into various suitable shapes to form the molded pulp discrete cushioning element. The embodiments discussed herein show various examples of the discrete cushioning element formed into a geometrical shape and the geometrical shape may include a cavity. For example, the discrete cushioning element may be formed by using a molded fiber process to form a cylindrical shape, as shown in FIGS. 1A-1D. For clarity with the other molded fiber discrete cushioning elements discussed herein, the cushioning element of this embodiment is referred to as a cylindrical-shaped cellulosic cushioning element 100. Such a shape may also be referred to as a cup shape or thimble-like shape. FIG. 1A is a side, perspective view of the cylindrical-shaped cellulosic cushioning element 100. FIG. 1B is a top view of the cylindrical-shaped cellulosic cushioning element 100. FIG. 1C is a bottom view of the cylindrical-shaped cellulosic cushioning element 100. FIG. 1D is a cross-sectional view of the cylindrical-shaped cellulosic cushioning element 100, taken along line 1D-1D in FIG. 1B.

The cylindrical-shaped cellulosic cushioning element 100 has a substantially cylindrical shape with at least one side wall 110, a bottom portion 120, and top portion 130. In this embodiment, the cylindrical shape is a circular cylindrical shape with the side wall 110 positioned radially from an axis that extends in an axial direction of the cylindrical-shaped cellulosic cushioning element 100. In this embodiment, the axis is a longitudinal axis 142. The top portion 130 is on a side of the cylindrical shape opposite the bottom portion 120. The bottom portion 120 includes a bottom wall 122, and the cylindrical-shaped cellulosic cushioning element 100 has a U-shape, in this embodiment, with the bottom portion 120 being rounded or having a curved or otherwise chamfered transition from the bottom wall 122 to the side wall 110.

The cylindrical-shaped cellulosic cushioning element 100 also includes a cavity 140 (or a pocket) formed therein with an opening 144 located in the top portion 130. The side wall 110 includes an inward-facing surface 112 facing the cavity 140 and an outward-facing surface 114. Likewise, the bottom portion 120 includes an inward-facing surface 124 facing the cavity 140 and an outward-facing surface 126.

The cavity 140 of this embodiment has a substantially cylindrical shape and, more specifically, a circular cylindrical shape. With the cavity 140, the cylindrical-shaped cellulosic cushioning element 100 is a hollow, discrete cushioning element.

The cylindrical-shaped cellulosic cushioning element 100 also includes a flange 132 formed on the top portion 130, having a top surface 134 and a bottom surface 136. The opening 144 is formed in the top surface 134 of the flange 132 in this embodiment. The side wall 110 projects (extends) downwardly from the bottom surface 136 of the flange 132, and the flange 132 extends outward (radially outward) from the outward facing surface 114 of the side wall 110. The cylindrical-shaped cellulosic cushioning element 100 may thus have a cylindrical projection 154 extending from the bottom surface 136 of the flange 132. The flange 132 includes an outer perimeter 138, such as an outer perimeter surface which, in this embodiment, is rectangular in shape.

As noted above, the cylindrical-shaped cellulosic cushioning element 100 is formed by using a molded pulp process (also known as a molded fiber process). The pulp or fibers used in this process are preferably cellulosic pulp and fibers and, even more preferably, pulp produced from post-consumer recycled paper, recycled paperboard/fiberboard, recycled cardboard, and the like. Waste paper, including paperboard/fiberboard and recycled cardboard, may be dissolved in water to defibrillate paper fibers, forming an aqueous slurry of paper (cellulosic) fibers. Other suitable cellulosic (paper) fibers sources may be used, and, in some embodiments, recycled paper fibers may be blended with other cellulosic (paper) fibers. Other suitable defibrillating methods and pulping methods (such as Kraft methods) may be used depending upon the source of cellulosic fibers.

One such molded pulp process is a vacuum forming process or wet fiber molding process. A forming tool having a surface shaped to correspond to the cylindrical-shaped cellulosic cushioning element 100 discussed above, such as a surface with a plurality of cylindrical projections, may be placed in the aqueous slurry of paper (cellulosic) fibers. The shaped surface may be referred to as a mold or molding surface. A vacuum is drawn, such as through the molding surface, to remove water and to cause the paper fibers to accumulate on the molding surface and take the shape of the molding surface. Once a desired thickness of paper fibers has been accumulated, the molding surface is removed from the aqueous slurry and the now molded paper fibers are allowed to dry. The molded paper fibers may be removed from the molding surface to complete drying, such as in a drying oven.

Figure 2A:
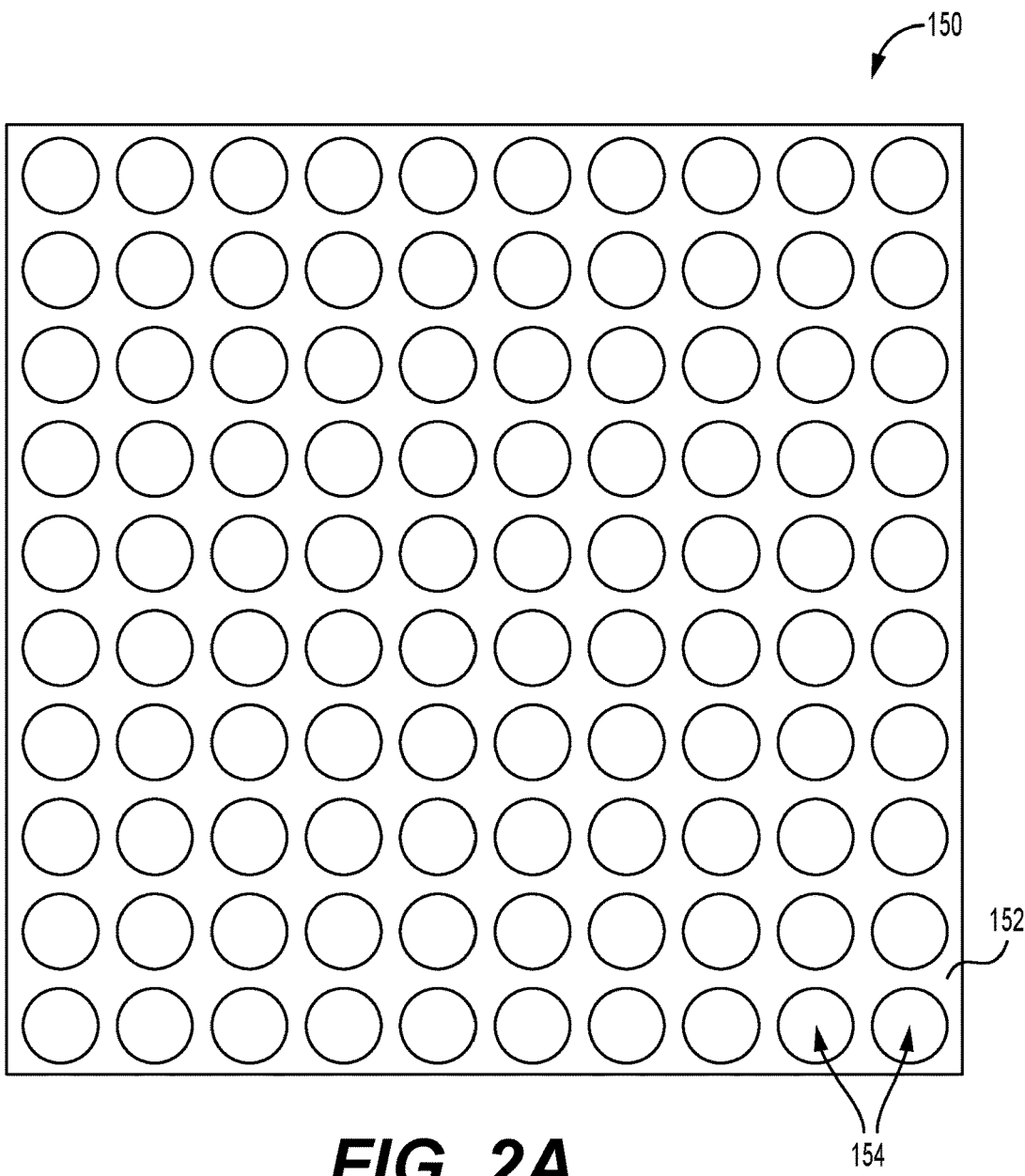
FIGS. 2A and 2B show a panel of a plurality of the cup-shaped cellulosic cushioning elements shown in FIGS. 1A-1D.
Figure 2B:
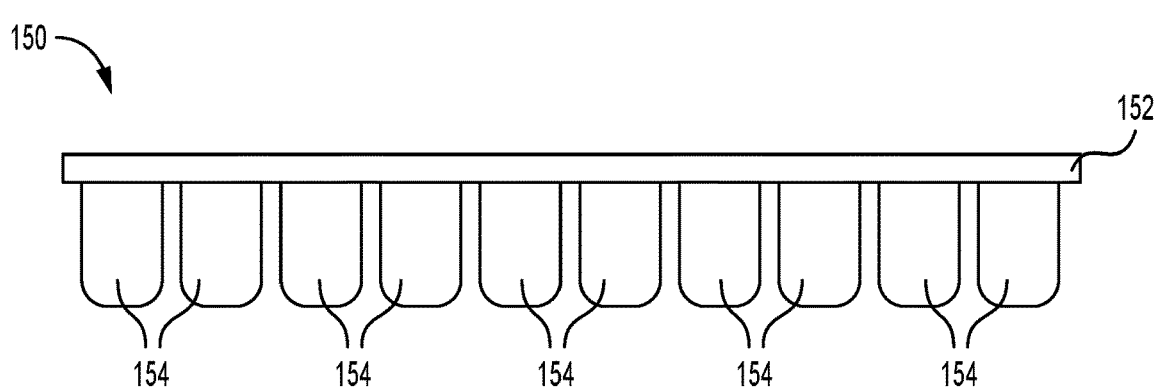

A plurality of the cylindrical-shaped cellulosic cushioning elements 100 may be formed simultaneously using the mold (molding surface), forming a panel 150 of the cylindrical-shaped cellulosic cushioning elements 100. FIG. 2A is a top view of such a panel 150, and FIG. 2B is a side view of the panel 150. The panel 150 of this embodiment, includes a generally planar layer 152 with a plurality of hollow, cylindrical projections 154 extending therefrom. The cylindrical projections 154 have the shape discussed above for the cylindrical-shaped cellulosic cushioning element 100. The cylindrical projections 154 are arrayed in a length and width direction of the panel 150. The cylindrical projections 154 may be separated from each other by cutting the planar layer 152 between the cylindrical projections 154 and forming the cylindrical-shaped cellulosic cushioning element 100. The planar layer 152 forms the flange 132 of the cylindrical-shaped cellulosic cushioning element 100. Any suitable cutting/separating process may be used, such as die cutting, for example.

Other suitable fiber molding processes may be used including, for example, dry fiber molding processes. In such dry fiber molding processes, the paper pulp/fibers are defibrillated, such as by milling, and then molded in a dry form (e.g., without the aqueous slurry). The dry, defibrillated paper fibers may be molded in a press mold under pressure and temperature to form the desired shape, such as the shapes discussed herein. In some processes, the dry, defibrillated paper fibers may be loosely formed into a sheet (referred to as a fiber sheet) by a vacuum, rolled (or otherwise shaped) to a desired thickness, and then fed to the press mold. Prior to being fed into the press mold, the fiber sheet may optionally include a tissue sheet applied to at least one of the top or bottom of the fiber sheet.

Figure 3A:
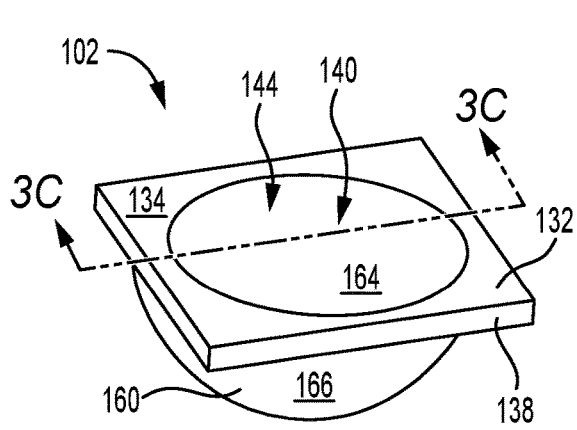
FIGS. 3A-3C show a hemispherical-shaped cellulosic cushioning element that can be used in the packing materials discussed herein.
Figure 3B:
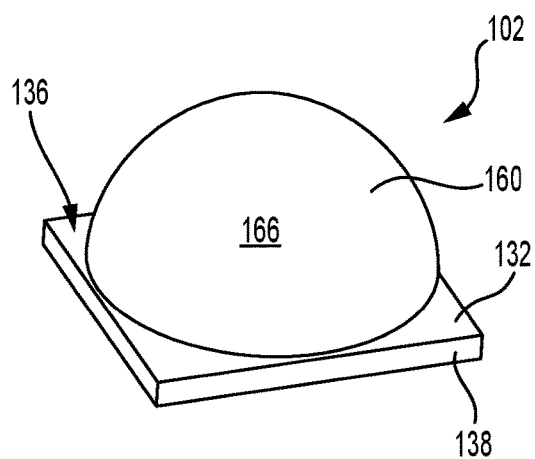
Figure 3C:
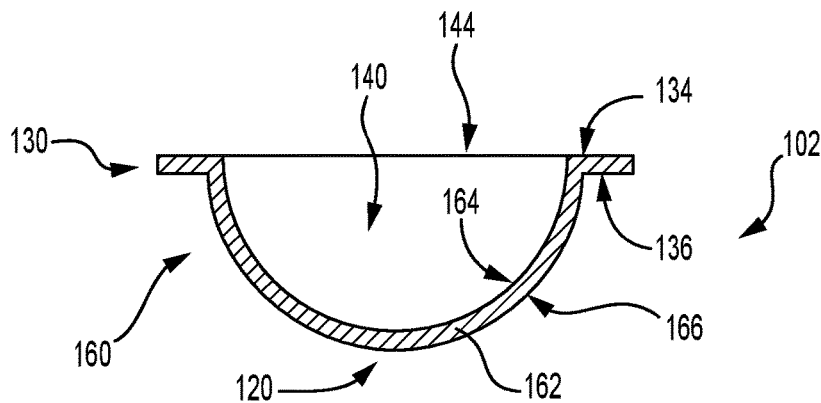

As noted above, the molded fiber discrete cushioning element may have other suitable shapes. FIGS. 3A-3C show another shape of a molded fiber discrete cushioning element. The molded fiber discrete cushioning element shown in FIGS. 3A-3C has a substantially hemispherical shape and, for clarity with the other molded fiber discrete cushioning elements discussed herein, the cushioning element of this embodiment is referred to as a hemispherical-shaped cellulosic cushioning element 102. The hemispherical-shaped cellulosic cushioning element 102 is similar to the cylindrical-shaped cellulosic cushioning element 100 but has an alternate shape, and the same reference numerals will be used for features of the hemispherical-shaped cellulosic cushioning element 102 that are the same or similar to the cylindrical-shaped cellulosic cushioning element 100 discussed above. The discussion of the cylindrical-shaped cellulosic cushioning element 100 and these features above also applies to the hemispherical-shaped cellulosic cushioning element 102, and a detailed discussion of these features is omitted here.

FIG. 3A is a top, perspective view of the hemispherical-shaped cellulosic cushioning element 102. FIG. 3B is a bottom, perspective view of the hemispherical-shaped cellulosic cushioning element 102. FIG. 3C is a cross-sectional view of the hemispherical-shaped cellulosic cushioning element 102, taken along line 3C-C in FIG. 3A. The hemispherical-shaped cellulosic cushioning element 102 includes a hemispherical projection 160 including a projection wall 162 projecting downward from the bottom surface 136 of the flange 132. The projection wall 162 is similar to the bottom wall 122 discussed above and includes an inward-facing surface 164 and an outward-facing surface 166.

Figure 4:
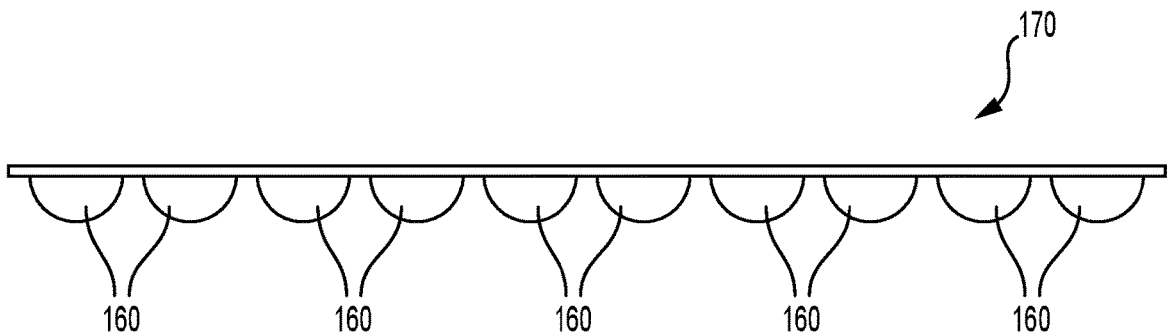
FIG. 4 is a side view of a panel of a plurality of the hemispherical-shaped cellulosic cushioning elements shown in FIGS. 3A-3C.

The hemispherical-shaped cellulosic cushioning element 102 may be formed similarly to the cylindrical-shaped cellulosic cushioning element 100 discussed above, such as by forming a panel 170 with a plurality of hemispherical projections 160 and separating the plurality of hemispherical projections 160 from each other to form the hemispherical-shaped cellulosic cushioning element 102. FIG. 4 is a side view of the panel 170. The panel 170 is similar to the panel 150 having a plurality of cylindrical projections 154, discussed above, and the discussion of the panel 150, applies here. The top view of the panel 170 is the same as shown in FIG. 2A.

Figure 5:
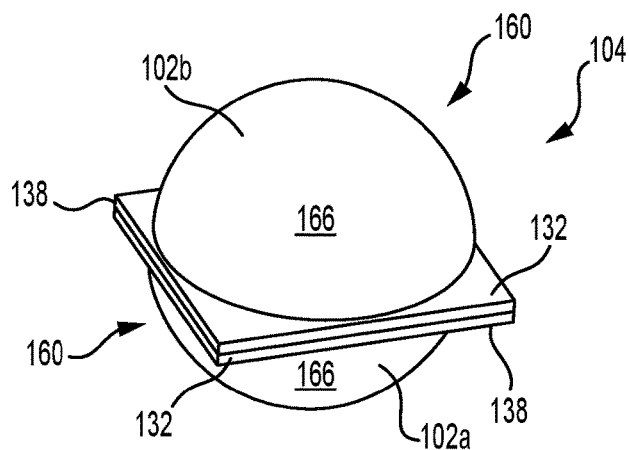
FIG. 5 shows a spherical-shaped cellulosic cushioning element formed using the hemispherical-shaped cellulosic cushioning elements shown in FIGS. 3A-3C.

FIG. 5 shows a further shape of a molded fiber discrete cushioning element. The molded fiber discrete cushioning element shown in FIG. 5 has a substantially spherical shape and, for clarity with the other molded fiber discrete cushioning elements discussed herein, the cushioning element of this embodiment is referred to as a spherical-shaped cellulosic cushioning element 104. The spherical-shaped cellulosic cushioning element 104 is similar to the hemispherical-shaped cellulosic cushioning element 102 but has an alternate shape. The same reference numerals will be used for features of the spherical-shaped cellulosic cushioning element 104 that are the same or similar to the hemispherical-shaped cellulosic cushioning element 102 discussed above. The discussion of the hemispherical-shaped cellulosic cushioning element 102 and these features above also applies to the spherical-shaped cellulosic cushioning element 104, and a detailed discussion of these features is omitted here.

In this embodiment, the spherical-shaped cellulosic cushioning element 104 is formed from two hemispherical-shaped cellulosic cushioning elements 102 bonded together with the opening 144 of a first hemispherical-shaped cellulosic cushioning element 102a opposing a corresponding opening 144 of a second hemispherical-shaped cellulosic cushioning element 102b. An adhesive may be applied to the top surface 134 of one of the first hemispherical-shaped cellulosic cushioning element 102a or the second hemispherical-shaped cellulosic cushioning element 102b. Preferably, the adhesive is biodegradable. Then, the flanges 132 and, more specifically, the top surfaces 134 of the first hemispherical-shaped cellulosic cushioning element 102a and the second hemispherical-shaped cellulosic cushioning element 102b are positioned to oppose each other and have the flanges 132 and, more specifically, the top surfaces 134 adhere to each other.

Figure 6A:
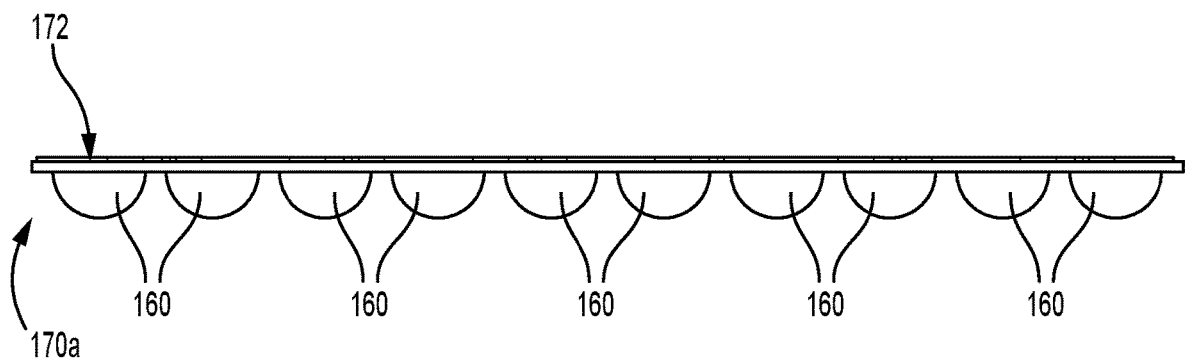
FIGS. 6A and 6B illustrate a method of forming the spherical-shaped cellulosic cushioning element shown in FIG. 5 from panels of the plurality of the hemispherical-shaped cellulosic cushioning elements shown in FIG. 4.
Figure 6B:
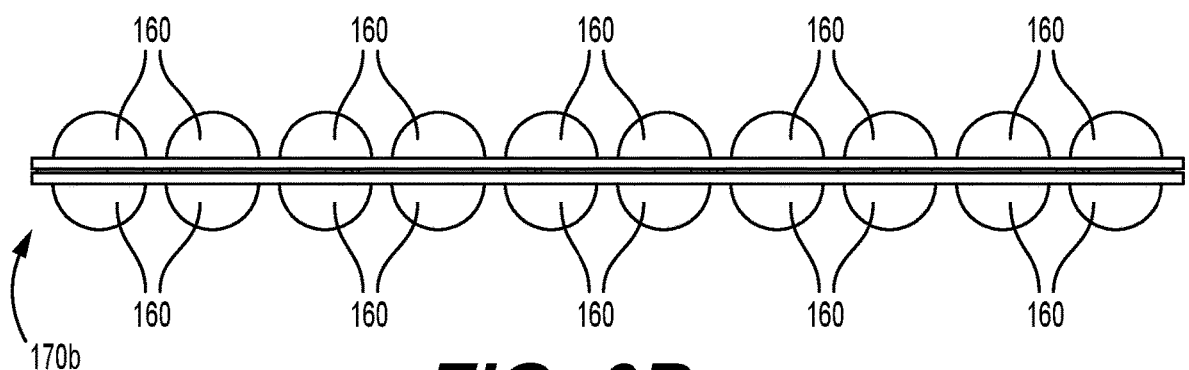

FIGS. 6A and 6B illustrate a method of forming the spherical-shaped cellulosic cushioning element 104. FIG. 6A is a first step, and FIG. 6B is a second step. Two panels 170 (a first panel 170a and a second panel 170b) of the hemispherical-shaped cellulosic cushioning element 102 are formed. In the step illustrated in FIG. 6A, an adhesive is applied to a top surface 172 of the first panel 170a. Then in the step illustrated in FIG. 6B, the second panel 170b is brought into contact with the first panel 170a, and more specifically, the top surface 172 of the second panel 170b is brought into contact with the top surface 172 of first panel 170a (to which adhesive has been applied). Preferably, the openings 144 of the hemispherical projections 160 in the second panel 170b are aligned with opening 144 of the hemispherical projections 160 in the first panel 170a. As discussed above, the spherical-shaped cellulosic cushioning element 104 may then be formed by separating opposed hemispherical projections 160, such as by cutting the opposed planar layers 152.

The molded fiber discrete cushioning elements may be used to form various packing materials. In the following discussion, the cylindrical-shaped cellulosic cushioning element 100 will be used to describe the various packing materials, but the following discussion applies to other molded fiber discrete cushioning elements, such as the hemispherical-shaped cellulosic cushioning element 102 and the spherical-shaped cellulosic cushioning element 104. In addition, although the various packing materials discussed below are shown with one shape of molded fiber cushioning elements, a mixture of shapes, such as a plurality of the cylindrical-shaped cellulosic cushioning elements 100 mixed with a plurality of the hemispherical-shaped cellulosic cushioning elements 102, may be used.

Figure 7:
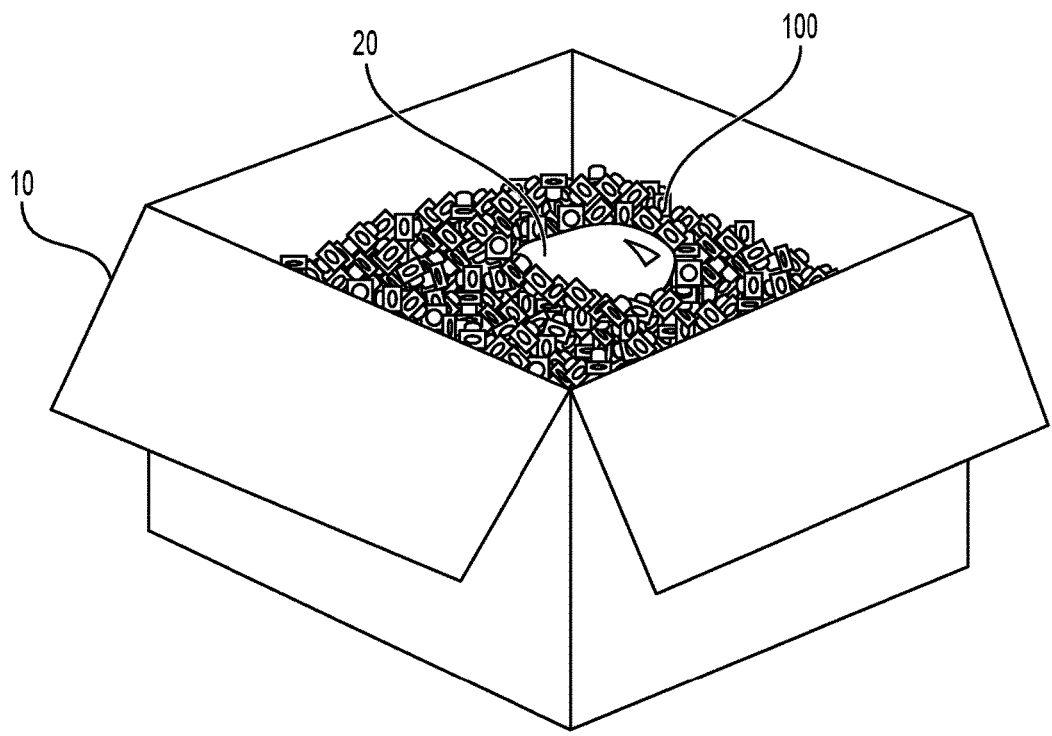
FIG. 7 is a shipping box containing an item and a plurality of the cylindrical-shaped cellulosic cushioning elements shown in FIGS. 1A-1D.

A plurality of the cylindrical-shaped cellulosic cushioning elements 100 may be used on their own as packing material. FIG. 7 shows, for example, a shipping box 10 that has an item-to-be-shipped 20 placed therein. The shipping box 10 may be any suitable shipping box including a carboard box.

The cylindrical-shaped cellulosic cushioning elements 100 may be placed in the shipping box 10 to surround the item-to-be-shipped 20. The cylindrical-shaped cellulosic cushioning element 100 is deformable to absorb energy and protect the item-to-be-shipped 20. Factors impacting the amount of energy absorbed that may be modified for the desired protection include the thickness of the walls (e.g., the side wall 110, the bottom wall 122, and the flange 132) of the molded pulp/fibers and the volume or size (e.g., diameter) of the cylindrical-shaped cellulosic cushioning element 100.

Figure 8:
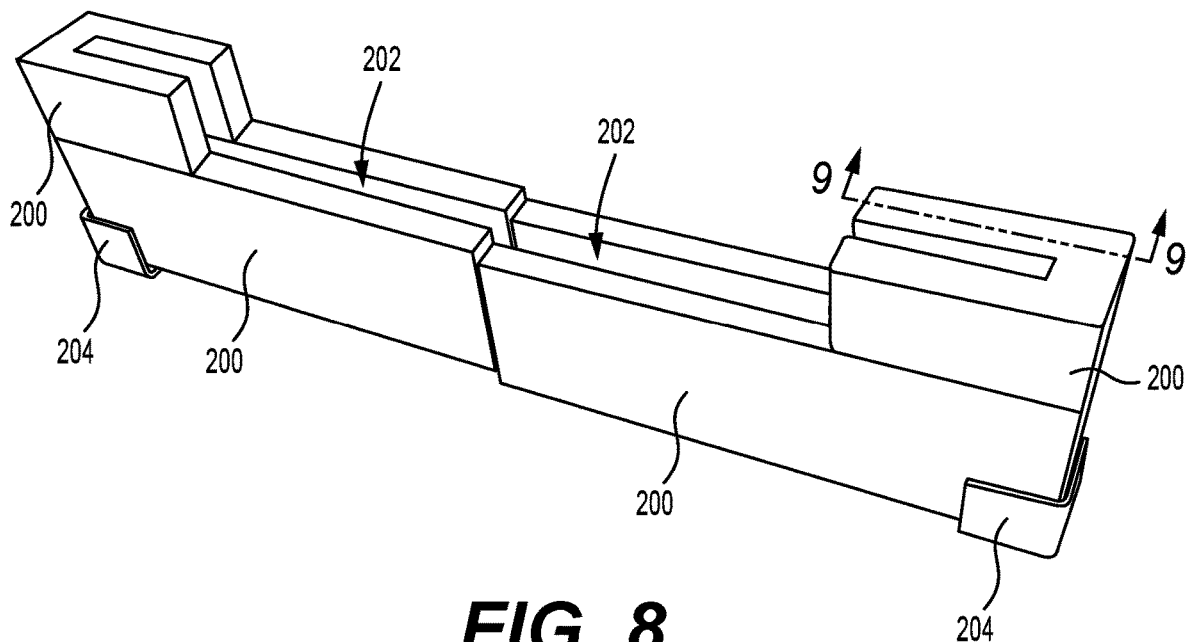
FIG. 8 shows a packing material using the cellulosic cushioning elements shown in FIGS. 1A-1D.

The cylindrical-shaped cellulosic cushioning elements 100 may also be suitable to make an EPS foam (or other plastic foam) replacement. Such a packing material is referred to herein as a molded packing material 200. FIG. 8 shows a plurality of the molded packing materials 200 arranged in a configuration to package an item-to-be-shipped 20 (not shown in FIG. 8), such as, for example, a TV. Each of the molded packing materials 200 in FIG. 8 has a rectangular shape, but the molded packing material 200 may be formed in other suitable shapes. For example, instead of a plurality of the molded packing materials 200 arranged to form an L-shape with a slot (or cavity 202) to receive the item-to-be-shipped, the molded packing material 200 may be formed in the L-shape with the cavity 202 formed therein. The molded packing material 200 may thus be formed into a shape in order to pack the item-to-be-shipped 20, and the molded shape may include recesses (e.g., cavity 202) and/or protrusions.

With the molded packing material 200 having a rectangular shape, the molded packing material 200 includes corners. In some embodiments, the molded packing material 200 may be used with a corner protector 204 that fits around the corner of the molded packing material 200 to protect the corner from damage. Such a corner protector 204 may include three faces that come together at a vertex. The corner protector 204 may be formed from a suitable material such as corrugated cardboard or be molded pulp/fibers, using the methods discussed above.

Figure 9:
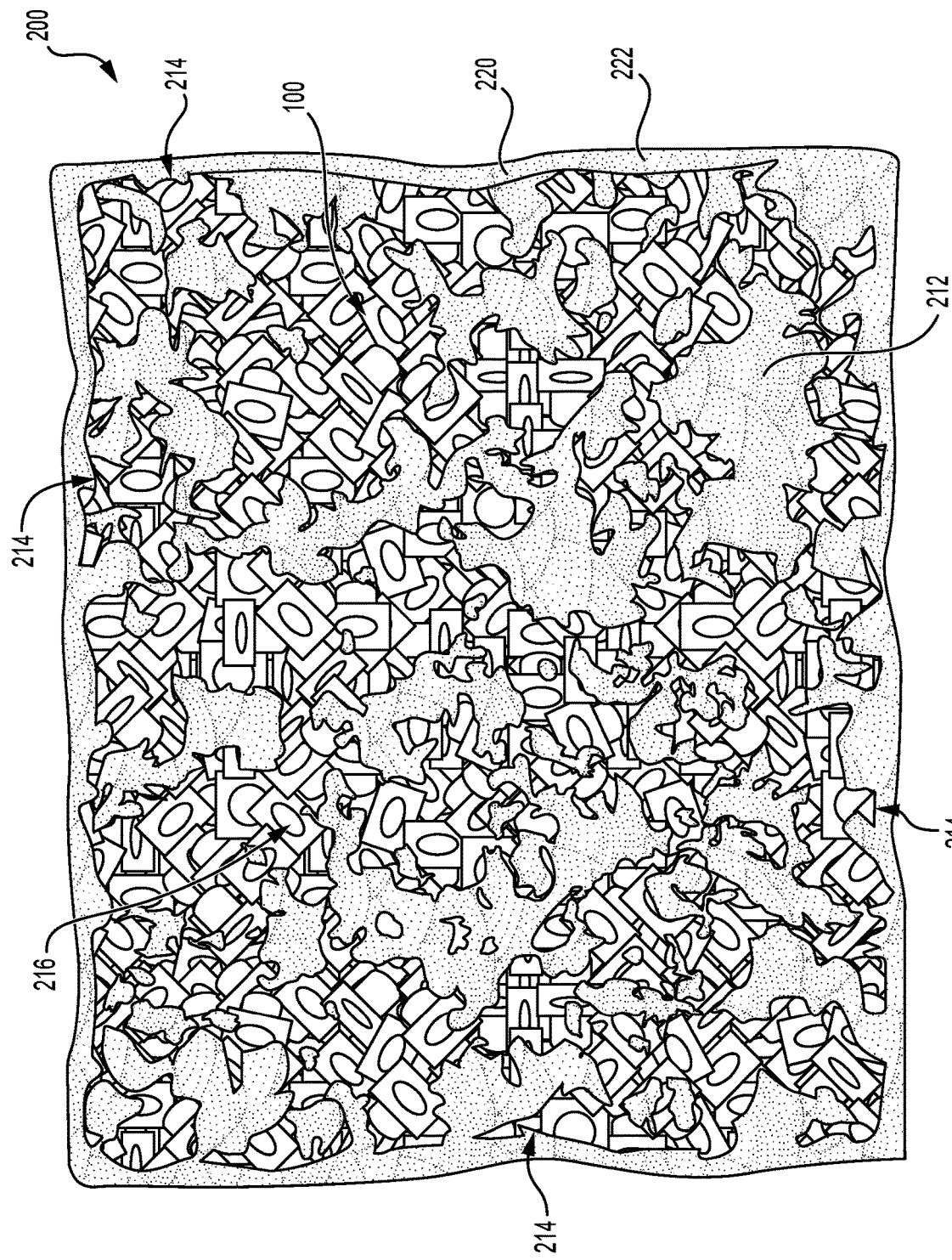
FIG. 9 is a cross-sectional view of the packing material shown in FIG. 8 taken along line 9-9 in FIG. 8.

FIG. 9 is a cross-sectional view of the molded packing material 200 taken along line 9-9 in FIG. 8. The molded packing material 200 of this embodiment includes a plurality of cylindrical-shaped cellulosic cushioning elements 100 that are formed into the desired shape and then joined together. The plurality of cylindrical-shaped cellulosic cushioning elements 100 may be joined together by bonds comprising adhesive and cellulosic (paper) fibers. In some embodiments, the plurality of cylindrical-shaped cellulosic cushioning elements 100 may be joined together by a matrix 212 of cellulosic (paper) fibers, and in a preferred embodiment, a matrix 212 of cellulosic (paper) fibers and an adhesive. Additional features of the bonds and matrix 212 will be discussed below in connection with the method of manufacturing the molded packing material 200. The plurality of cylindrical-shaped cellulosic cushioning elements 100 and matrix 212 thus form a mass that has been molded into a shape having exterior surfaces 214 and an interior 216 with some of the plurality of cylindrical-shaped cellulosic cushioning elements 100 being on the exterior surfaces 214 of the mass and the remainder of the plurality of the cylindrical-shaped cellulosic cushioning elements 100 being in the interior 216 of the mass.

Figure 10:
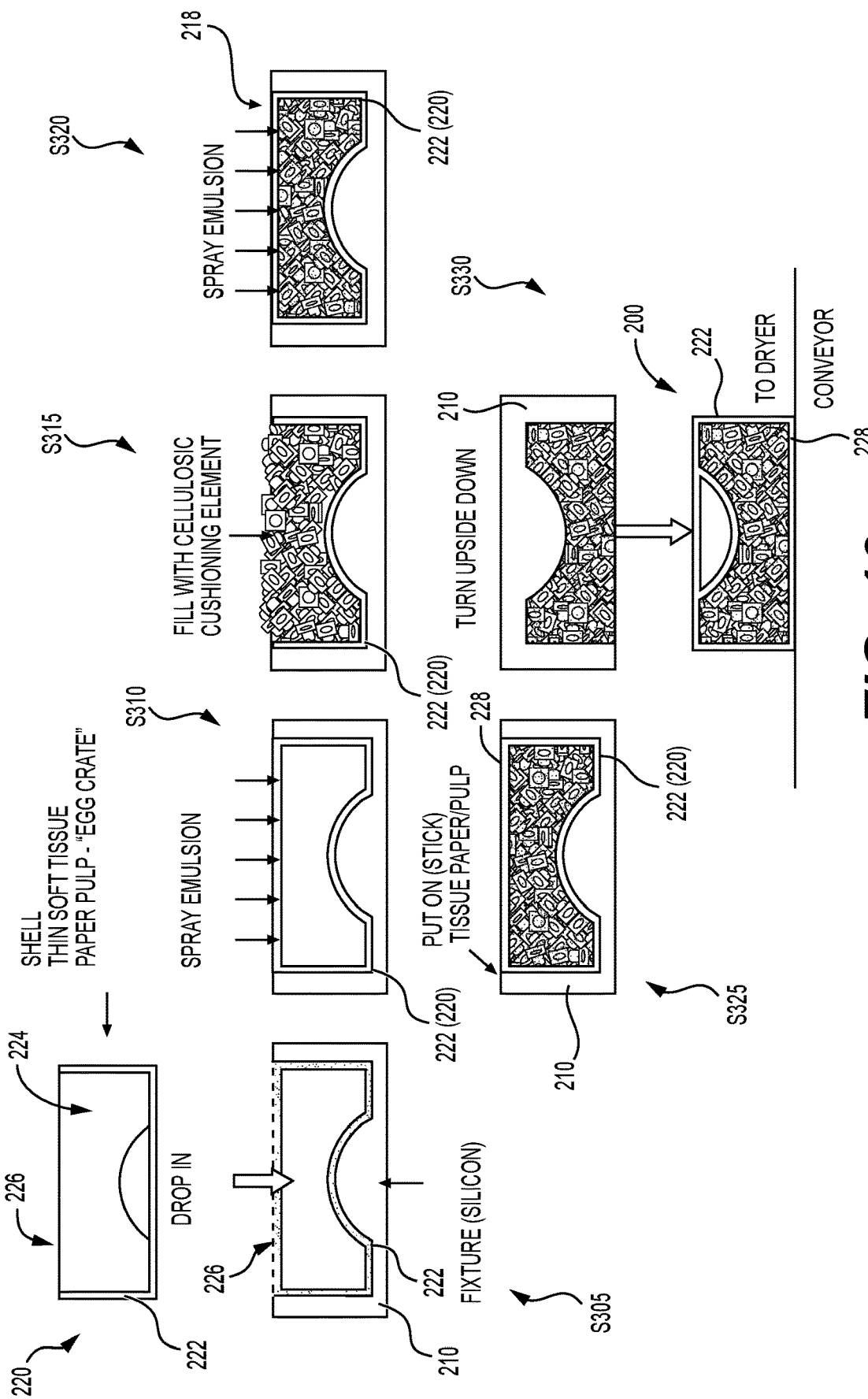
FIG. 10 illustrates a method used to manufacture the packing material shown in FIG. 8.

A method of manufacturing the molded packing material 200 shown in FIGS. 8 and 9 will be described with reference to FIG. 10. First, a mold 210 having the desired shape is provided. The mold 210 may preferably be silicon. Optionally, the outer surfaces of the molded packing material 200 may be covered with a paper fiber shell 220. The paper fiber shell 220 may be formed of multiple portions including a container portion 222. The container portion 222 generally has the shape of the molded packing material 200 with a cavity 224 formed therein. The container portion 222 also includes an opening 226 that is used to fill the paper fiber shell 220 with cylindrical-shaped cellulosic cushioning elements 100, as discussed below. The paper fiber shell 220 may also include a cover 228 to close the opening 226 after the cavity 224 has been filled with the cylindrical-shaped cellulosic cushioning elements 100. The paper fiber shell 220 and, more specifically, the container portion 222 and the cover 228, may be formed in the desired shape of the molded packing material 200 using a molded fiber process, such as the processes discussed above. The paper fiber shell 220 may also be referred to as a molded fiber shell. In some embodiments, particularly when formed using the wet fiber molding process discussed above, the paper fiber shell 220 may be referred to as a paper pulp shell or a molded pulp shell. If a paper fiber shell 220 is used, the container portion 222 of the paper fiber shell 220 is placed into the mold 210 in step S305. In another variation, instead of a paper fiber shell 220, outer sheets may be used. The sheet is preferably a cellulosic (paper) sheet and placed into the mold 210 in a manner similar to the paper fiber shell 220. Although the molded packing material 200 is preferably used with the mold 210, using the paper fiber shell 220 may allow the mold 210 to be omitted.

In step S310, an emulsion of water, cellulosic (paper) fibers, and preferably adhesive is sprayed onto the surface of the paper fiber shell 220. Then, in step S315, the mold 210 and paper fiber shell 220 (container portion 222), if used, is filled with the cylindrical-shaped cellulosic cushioning elements 100.

Next, in step S320, an emulsion of water, cellulosic (paper) fibers, and preferably adhesive is sprayed into the mold 210 with the cylindrical-shaped cellulosic cushioning elements 100. The emulsion flows around and between the cylindrical-shaped cellulosic cushioning elements 100. If the paper fiber shell 220 is used, the cover 228 may be placed on top of an exposed surface 218 of the cylindrical-shaped cellulosic cushioning elements 100 in step S325.

The paper fiber shell 220, if used, and cylindrical-shaped cellulosic cushioning elements 100 with the emulsion is then removed from the mold 210 in step S330, such as by turning the mold 210 upside down, and then dried to form the molded packing material 200. The drying step, or portions thereof, may also take place before removing the paper fiber shell 220 and cylindrical-shaped cellulosic cushioning elements 100 from the mold 210.

As the cylindrical-shaped cellulosic cushioning elements 100 with the emulsion is dried bonds form between the cylindrical-shaped cellulosic cushioning elements 100. The emulsion may form, as it is dried, the matrix 212 around the cylindrical-shaped cellulosic cushioning elements 100, and the cylindrical-shaped cellulosic cushioning elements 100 may be connected to each other by the cellulosic fibers and, when used, the adhesive of the matrix 212. The molded packing material 200 may thus include a plurality of cylindrical-shaped cellulosic cushioning elements 100 that are interconnected to each other by cellulosic fibers. The cylindrical-shaped cellulosic cushioning elements 100 may retain some of the air pockets therein. For example, the cylindrical-shaped cellulosic cushioning elements 100 discussed herein include a cavity 140 and in some embodiments, the emulsion may not flow completely into the cavity 140 and the molded packing material 200 may also be described as having discrete groupings of air (gas) pockets interspersed within a cellulosic (paper) mass.

As discussed above, factors impacting the amount of energy absorbed include the thickness of the walls (e.g., the side wall 110, the bottom wall 122, and the flange 132) of the molded pulp/fibers, the volume or size (e.g., diameter) of the cylindrical-shaped cellulosic cushioning elements 100, and the density of the cylindrical-shaped cellulosic cushioning elements. If used, the thickness of the paper fiber shell 220 may also be modified. In this embodiment, the amount of emulsion and the amount of the cellulosic fibers and the amount of adhesive in the emulsion may also be modified to create a packing material with the desired strength and energy absorbing properties. The emulsions discussed herein may be referred to herein as an aqueous slurry of cellulosic fibers and adhesive. In the emulsions discussed herein the cellulosic fibers are preferably the same fibers as are used in the paper for the cylindrical-shaped cellulosic cushioning elements 100. In addition, the adhesive of the emulsion is preferably biodegradable and the emulsion is thus a biodegradable emulsion.

Figure 11:
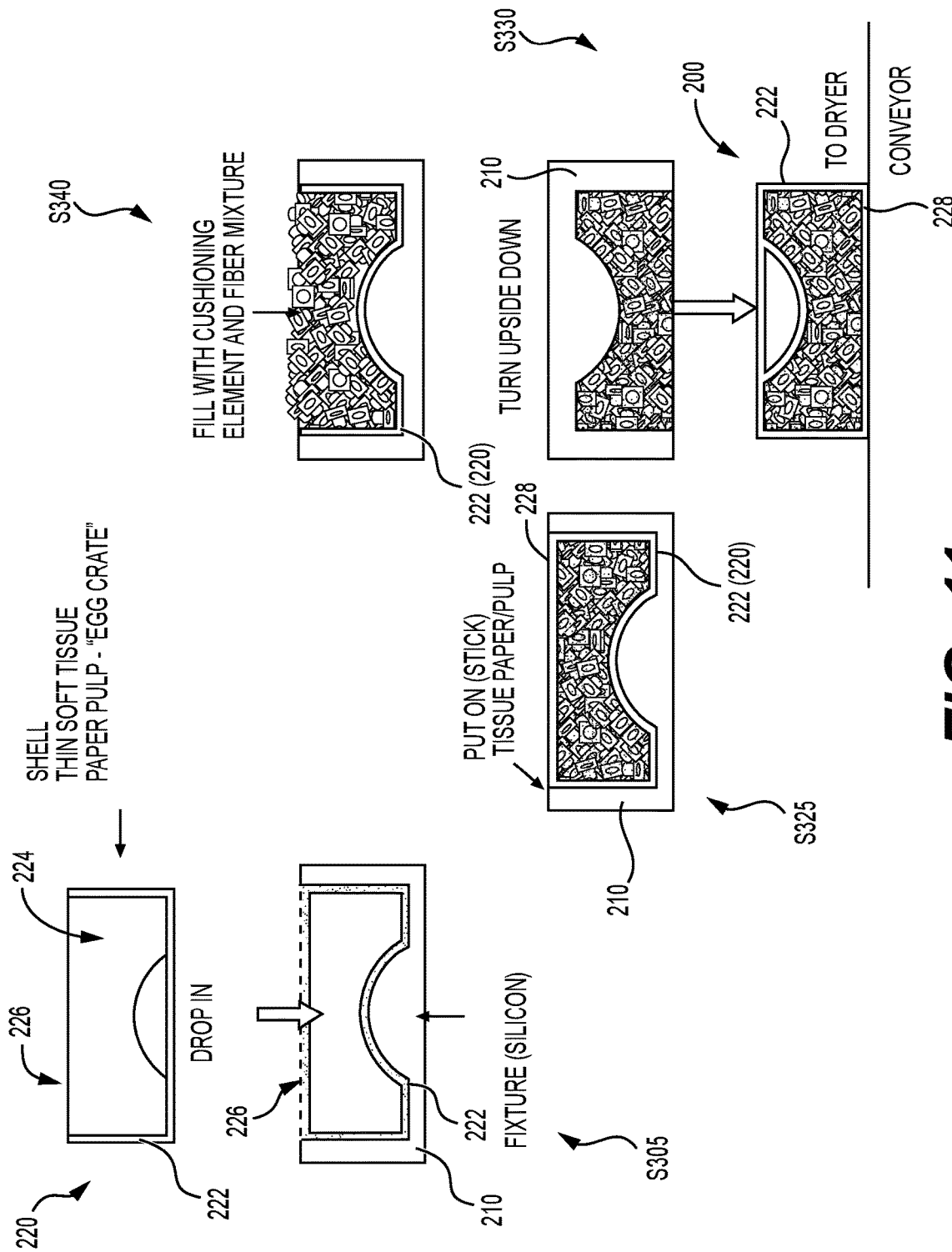
FIG. 11 illustrates a variation of the method used to manufacture the packing material shown in FIG. 8.

A variation of the method of manufacturing the molded packing material 200 shown in FIGS. 8 and 9 will be described with reference to FIGS. 11 and 12. This method is similar to the method discussed above, and the same reference numerals will be used for features and steps of this method that are the same or similar to the method discussed above with reference to FIG. 10. The discussion of such steps and features above also applies to the method discussed with reference to FIG. 11, and a detailed discussion of these features and steps is omitted here. In the method discussed above, the emulsion of water, cellulosic (paper) fibers, and preferably adhesive is sprayed into the mold 210 (in step S310) after the mold 210 and paper fiber shell 220 (container portion 222), if used, is filled with the cylindrical-shaped cellulosic cushioning elements 100 (in step S315). In the method illustrated in FIG. 11, the emulsion is first mixed with the cylindrical-shaped cellulosic cushioning elements 100 to form a cushioning element and fiber mixture. Then in step S340, the mold 210 and paper fiber shell 220 (container portion 222), if used, is filled with the cushioning element and fiber mixture. Accordingly, step S340 of the method illustrated in FIG. 11 may take the place of steps S310, S315, and S320 of the method illustrated in FIG. 10.

Figure 12:
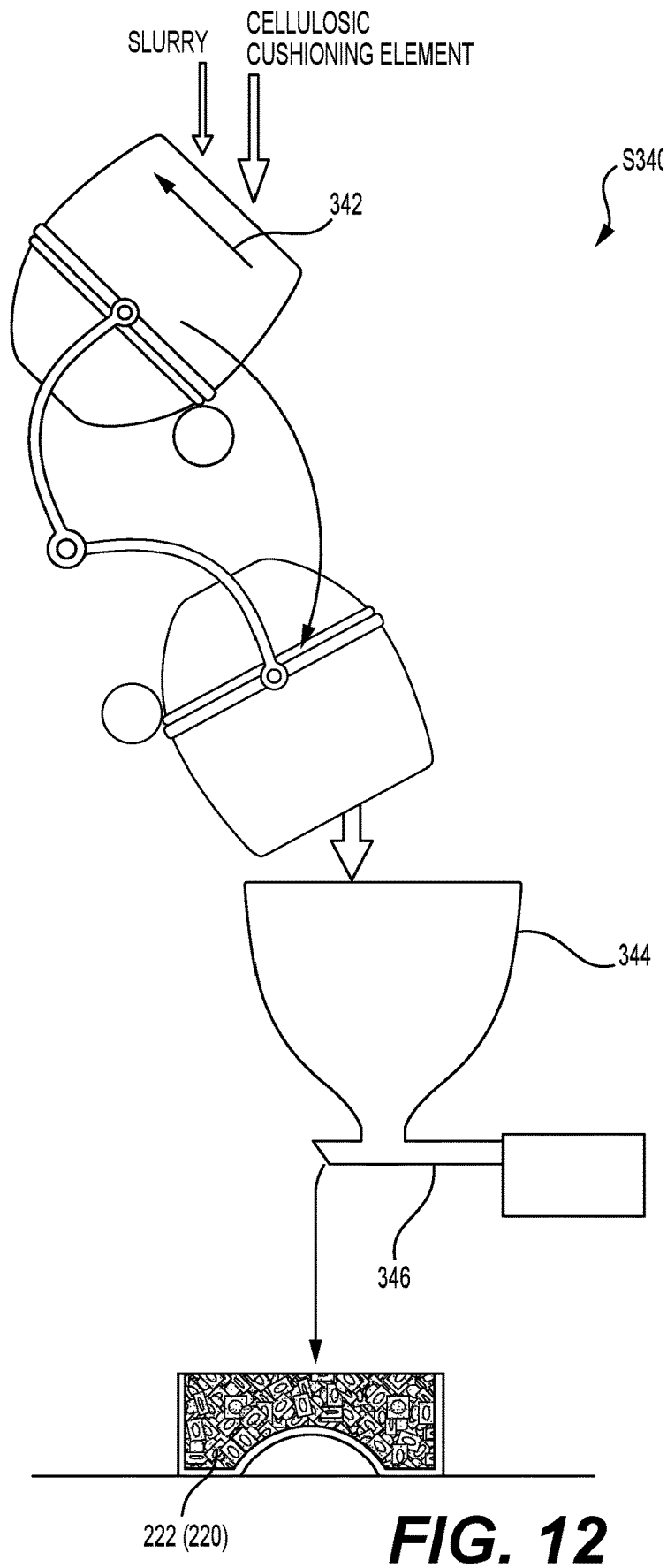
FIG. 12 further illustrates one of the steps in the method shown in FIG. 11.

FIG. 12 shows how the cushioning element and fiber mixture may be formed and how the mold 210 and paper fiber shell 220 (container portion 222), if used, is filled in step S340. A desired amount of each of the cylindrical-shaped cellulosic cushioning elements 100 and the emulsion are supplied to a mixing drum 342. The mixing drum 342 can be rotated to agitate and mix the cylindrical-shaped cellulosic cushioning elements 100 and the emulsion. The mixing drum 342 is rotated or otherwise moved to pour the cushioning element and fiber mixture from the mixing drum 342 into a hopper 344. The hopper 344 holds the cushioning element and fiber mixture and then when the mold 210 and paper fiber shell 220 (container portion 222) is positioned under an outlet of the hopper 344, a suitable actuator 346, such as a screw type actuator, discharges or otherwise releases a desired amount of the cushioning element and fiber mixture to fill the mold 210 and paper fiber shell 220 (container portion 222).

Figure 13:
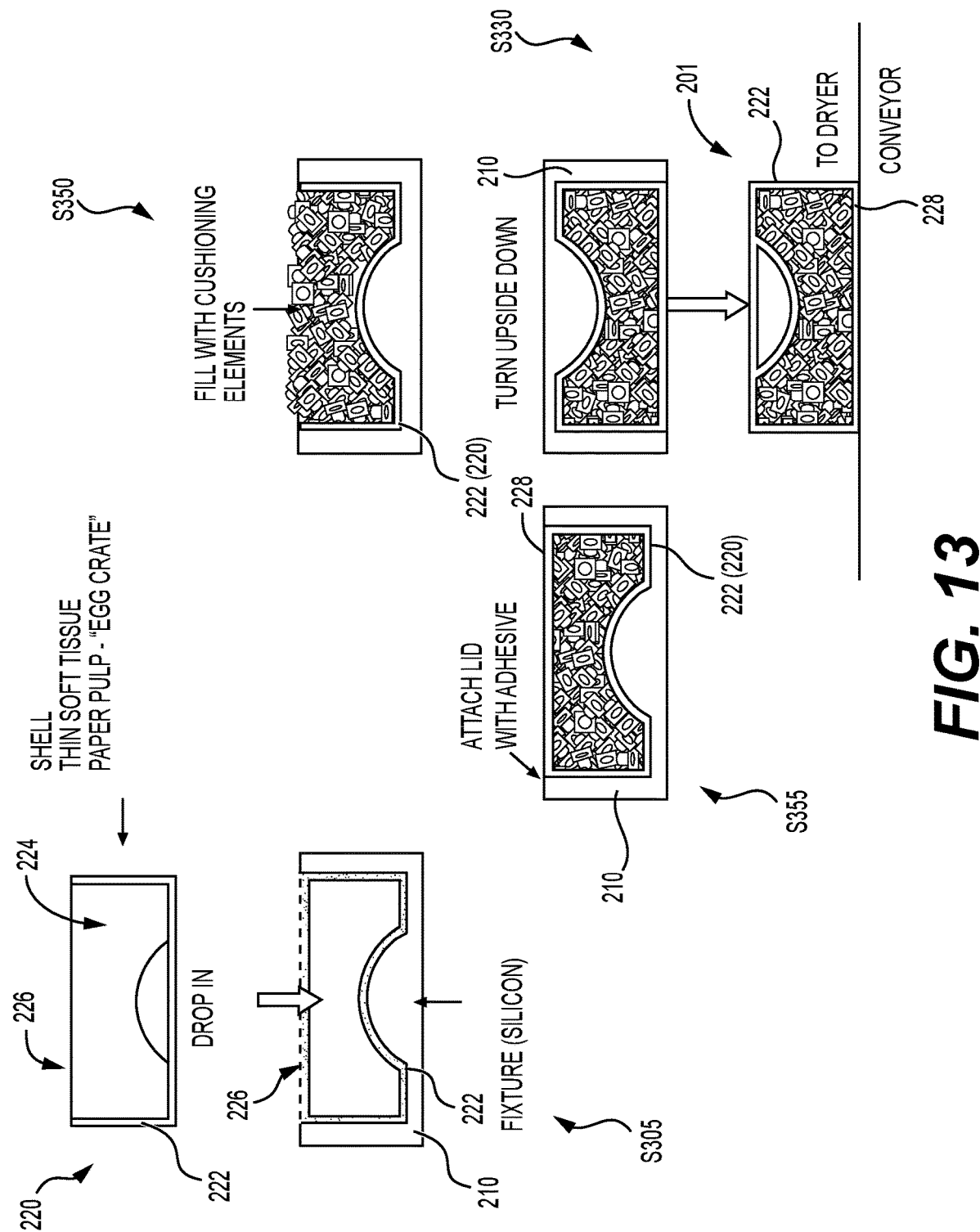
FIG. 13 illustrates a method used to manufacture another packing material using the cellulosic cushioning elements shown in FIGS. 1A-1D.
Figure 14:
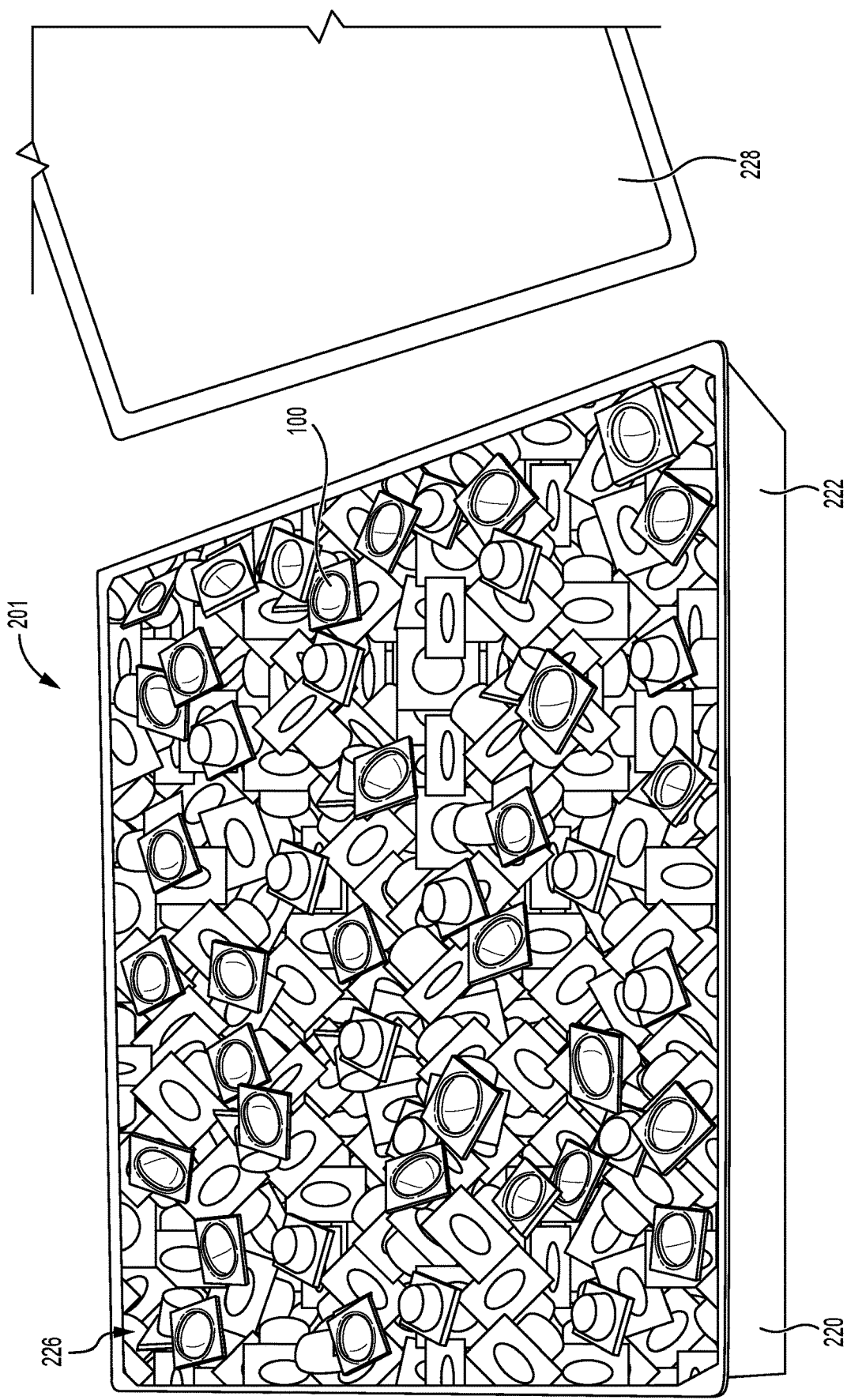
FIG. 14 is a view of a step of the method described with reference to FIG. 13.

Another molded packing material 201 using the cylindrical-shaped cellulosic cushioning element 100 is shown and described with reference to FIGS. 13 and 14. FIG. 13 illustrates a method of manufacturing the molded packing material 201. FIG. 14 shows the features of the molded packing material 201 in a step of the method shown in FIG. 13. In the molded packing material 200 discussed above, the plurality of cylindrical-shaped cellulosic cushioning elements 100 are joined together by the matrix 212 and, in some embodiments, located within a paper fiber shell 220. In this embodiment, the molded packing material 201 does not include the matrix, but instead the cylindrical-shaped cellulosic cushioning elements 100 are constrained and form the molded shape using the paper fiber shell 220. The cylindrical-shaped cellulosic cushioning elements 100 are free from attachment to one another within the molded packing material 201 of this embodiment, but the molded packing material 201 is otherwise similar to the molded packing material 200 discussed above. The discussion of the molded packing material 200 above also applies to the molded packing material 201 of this embodiment. The same reference numerals are used for features of the molded packing material 201 of this embodiment that are the same or similar to the features of the molded packing material 200 discussed above, and a detailed discussion of these features is omitted here.

The method of manufacturing the molded packing material 201 is shown in FIG. 13. This method is similar to the methods discussed above, such as the method shown and described with reference to FIG. 10, and the same reference numerals will be used for features and steps of this method that are the same or similar to the method discussed above with reference to FIG. 10. The discussion of such steps and features above also applies to the method discussed with reference to FIG. 13, and a detailed discussion of these features and steps is omitted here. As noted above, the molded packing material 201 does not include the matrix and thus the emulsion of water, cellulosic (paper) fibers, and preferably adhesive is not used in the method shown in FIG. 13, and steps S310, S315, and S320 of the method illustrated in FIG. 10 are omitted in the method shown in FIG. 13.

In the method shown in FIG. 13, the paper fiber shell 220 and, more specifically, the container portion 222 of the paper fiber shell 220 is provided in step S305. The mold 210 is optional in this method, but if used, step S305 may be substantially the same as the corresponding step shown in FIG. 10. Next, in step S350, the paper fiber shell 220 and, more specifically, the container portion 222 of the paper fiber shell 220 is filled with the cylindrical-shaped cellulosic cushioning elements 100. Then, in step S355, the cover 228 is positioned on the container portion 222 to close the opening 226 after the cavity 224 has been filled with the cylindrical-shaped cellulosic cushioning elements 100. The cover 228 may be attached to the container portion 222 by various suitable means including, for example, adhesive applied to the periphery of the cover 228 and/or the container portion 222. The method then continues to step S330 in the manner discussed above.

FIG. 14 shows the molded packing material 201 in step S355 after the container portion 222 of the paper fiber shell 220 is filled with the cylindrical-shaped cellulosic cushioning elements 100 and before the cover 228 has been attached to the container portion 222. The molded packing material 201 thus includes the paper fiber shell 220 with a cavity 224 formed therein. The cylindrical-shaped cellulosic cushioning elements 100 are located within the cavity 224 and may fill the cavity 224. More specifically, the paper fiber shell 220 includes the container portion 222 having the cavity 224 formed therein and the opening 226 for filling the cavity 224 with the cylindrical-shaped cellulosic cushioning elements 100. The paper fiber shell 220 also includes the cover 228 positioned over the opening 226 of the container portion 222 of the paper fiber shell 220 to close the opening 226.

Although this invention has been described with respect to certain specific exemplary embodiments, many additional modifications and variations will be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:

1. A packing material comprising:
   a molded fiber shell including:
      a container portion having a cavity formed therein and an opening for filling the cavity; and
      a cover positioned over the opening of the container portion of the molded fiber shell to close the opening; and
   a plurality of cylindrical-shaped molded fiber cushioning elements located in the cavity of the molded fiber shell and enclosed by the molded fiber shell when the cover is positioned over the opening, each of the plurality of cylindrical-shaped molded fiber cushioning elements being discrete from each other, each of the cylindrical-shaped molded fiber cushioning elements having a bottom portion and a top portion, each of the cylindrical-shaped molded fiber cushioning elements including a side wall forming the cylindrical shape and a bottom wall, the side wall having an inward-facing surface delineating a cavity, the bottom wall being located on the bottom portion to enclose the cavity, the cavity being an open cavity with an opening to the cavity formed in the top portion.

2. The packing material of claim 1, wherein at least a portion of the plurality of the cylindrical-shaped molded fiber cushioning elements are bonded to each other.

3. The packing material of claim 1, wherein each of the plurality of cylindrical-shaped molded fiber cushioning elements includes a flange.

4. The packing material of claim 1, wherein the cavity is a cylindrical cavity formed therein.

5. The packing material of claim 1, wherein each of the cylindrical-shaped molded fiber cushioning elements has a top surface with the opening to the cavity formed on the top surface.

6. The packing material of claim 1, wherein the side wall includes an outward facing surface, and each of the cylindrical-shaped molded fiber cushioning elements further includes a flange extending outward from the outward facing surface.

7. The packing material of claim 6, wherein the flange is located on the top portion.

8. A packing configuration comprising a plurality of the packing materials of claim 1, wherein plurality of the packing materials are arranged relative to each other to form a cavity for an item-to-be-shipped.

9. A package comprising:
   an item to be shipped;
   one or more the packing materials of claim 1 positioned around the item to be shipped; and
   a shipping box positioned around the one or more packing materials.

10. A packing material comprising:
    a fiber shell;
    a matrix comprising cellulosic fibers; and
    a plurality of molded pulp cushioning elements dispersed within the matrix formed around and between the molded pulp cushioning elements, such that the cellulosic fibers join the plurality of molded pulp cushioning elements to each other,
    wherein the plurality of molded pulp cushioning elements and matrix form a mass that has been molded into a shape having exterior surfaces and an interior with some of the plurality of molded pulp cushioning elements being on the exterior surfaces of the mass and the remainder of the plurality of molded pulp cushioning elements being in the interior of the mass, the mass being located within the fiber shell.

11. The packing material of claim 10, wherein the matrix further comprises adhesive, such that adhesive bonds also join the plurality of molded pulp cushioning elements.

12. The packing material of claim 10, wherein the fiber shell formed from a plurality of paper sheets.

13. The packing material of claim 12, wherein the plurality of paper sheets encloses the plurality of molded pulp cushioning elements.

14. The packing material of claim 10, wherein the fiber shell is a molded fiber shell.

15. The packing material of claim 14, wherein the fiber shell includes:
    a container portion having a cavity formed therein and an opening for filling the cavity with the plurality of molded pulp cushioning elements; and
    a cover positioned over the opening of the container portion of the fiber shell to close the opening.

16. The packing material of claim 10, wherein each of the plurality of molded pulp cushioning elements has a geometric shape and a cavity therein.

17. The packing material of claim 16, wherein each of the plurality of molded pulp cushioning elements includes an opening to the cavity.

18. The packing material of claim 10, wherein the plurality of molded fiber cushioning elements includes at least one of hemispherical-shaped molded fiber cushioning elements, spherical-shaped molded fiber cushioning elements, or cylindrical-shaped molded fiber cushioning elements.

19. The packing material of claim 10, wherein each of the plurality of molded pulp cushioning elements includes a flange.

20. The packing material of claim 10, wherein the plurality of molded pulp cushioning elements includes cylindrical-shaped molded pulp cushioning elements.

21. The packing material of claim 20, wherein each of the cylindrical-shaped molded pulp cushioning elements includes a cylindrical cavity formed therein.

22. The packing material of claim 21, wherein each of the cylindrical-shaped molded pulp cushioning elements has a circular cylindrical shape and the cylindrical cavity has a circular cylindrical shape.

23. The packing material of claim 21, wherein each of the cylindrical-shaped molded pulp cushioning elements has a top surface with an opening to the cylindrical cavity formed on the top surface.

24. The packing material of claim 21, wherein each of the cylindrical-shaped molded pulp cushioning elements includes a side wall forming the cylindrical shape, the side wall including an outward facing surface, and each of the cylindrical-shaped molded pulp cushioning elements further includes a flange extending outward from the outward facing surface.

25. The packing material of claim 24, wherein each of the cylindrical-shaped molded pulp cushioning elements includes a top portion, the flange being located on the top portion.

26. The packing material of claim 24, wherein the side wall includes an inward facing surface defining the cylindrical cavity.

27. The packing material of claim 10, wherein the packing material is formed in a shape having a recess.

28. The packing material of claim 10, wherein the packing material is formed in a shape having a protrusion.

29. A packing configuration comprising a plurality of the packing materials of claim 10, wherein plurality of the packing materials are arranged relative to each other to form a cavity for an item-to-be-shipped.

30. A package comprising:
an item to be shipped;
one or more the packing materials of claim 10 positioned around an item to be shipped; and
a shipping box positioned around the one or more packing materials.

* * * * *